US008504876B2

(12) United States Patent
Mork et al.

(10) Patent No.: US 8,504,876 B2
(45) Date of Patent: Aug. 6, 2013

(54) ANOMALY DETECTION FOR DATABASE SYSTEMS

(75) Inventors: Peter Mork, Rockville, MD (US); Adriane Chapman, Arlington, VA (US); Ken Samuel, McLean, VA (US); Irina Vayndiner, Oak Hill, VA (US); David Moore, Manassas, VA (US)

(73) Assignee: The MITRE Corporation, McLean, VA (US)

( * ) Notice: Subject to any disclaimer, the term of this patent is extended or adjusted under 35 U.S.C. 154(b) by 356 days.

(21) Appl. No.: 12/771,263

(22) Filed: Apr. 30, 2010

(65) Prior Publication Data

US 2011/0271146 A1 Nov. 3, 2011

(51) Int. Cl.
*G06F 11/00* (2006.01)

(52) U.S. Cl.
USPC ................................ 714/37; 714/25; 707/713

(58) Field of Classification Search
USPC .......................................... 714/25, 37; 707/713
See application file for complete search history.

(56) References Cited

U.S. PATENT DOCUMENTS

| | | | |
|---|---|---|---|
| 6,950,773 B1 * | 9/2005 | Gross et al. .................... 702/132 |
| 7,454,313 B2 * | 11/2008 | Whitlow et al. ............... 702/182 |
| 7,636,871 B1 * | 12/2009 | Blue et al. ......................... 714/32 |
| 7,702,692 B2 * | 4/2010 | Chandrasekaran ............ 707/783 |
| 7,958,159 B1 * | 6/2011 | Tran et al. ...................... 707/802 |
| 8,051,102 B2 * | 11/2011 | Everett ........................... 707/793 |
| 8,122,066 B2 * | 2/2012 | Castellanos et al. ........... 707/803 |
| 8,191,070 B2 * | 5/2012 | Gerovac et al. ............... 718/104 |
| 8,209,687 B2 * | 6/2012 | Yuyitung et al. ................... 718/1 |
| 2003/0225768 A1 * | 12/2003 | Chaudhuri et al. ............. 707/10 |
| 2005/0050187 A1 * | 3/2005 | Freimuth et al. ............... 709/223 |
| 2005/0283511 A1 * | 12/2005 | Fan et al. ........................ 708/306 |
| 2006/0168166 A1 * | 7/2006 | Hardwick et al. ............. 709/221 |
| 2006/0253471 A1 * | 11/2006 | Wasserman et al. ........... 707/100 |
| 2007/0136809 A1 * | 6/2007 | Kim et al. ......................... 726/22 |
| 2007/0250829 A1 * | 10/2007 | Hillier et al. ................... 717/170 |
| 2008/0250265 A1 * | 10/2008 | Chang et al. ....................... 714/4 |
| 2008/0271038 A1 * | 10/2008 | Rolia et al. ..................... 718/105 |
| 2009/0013194 A1 * | 1/2009 | Mir et al. ....................... 713/193 |
| 2009/0049547 A1 * | 2/2009 | Fan ................................... 726/22 |
| 2009/0193293 A1 * | 7/2009 | Stolfo et al. ..................... 714/26 |
| 2009/0228431 A1 * | 9/2009 | Dunagan et al. .................. 707/2 |

(Continued)

OTHER PUBLICATIONS

Boley, D. et al., "An Unsupervised Clustering Tool for Unstructured Data", Proceedings of the Machine Learning for Information Filtering Workshop at the International Joint Conference on Artificial Intelligence, Stockholm, 1999, 5 pages.

(Continued)

*Primary Examiner* — Loan L. T. Truong
(74) *Attorney, Agent, or Firm* — Sterne, Kessler, Goldstein & Fox PLLC

(57) ABSTRACT

Methods, systems and computer program products for detecting anomalies for a database system are provided. A method may include extracting workload features from a query optimizer based on a query workload and generating feature models for the extracted workload features. The method may also include extracting instance features from the query optimizer based on a query instance. Instance feature values may be obtained. The method may further include applying a query instance to the workload feature models to produce a prediction value for each workload feature. Anomalies may be reported based on a comparison of each instance feature value with a corresponding prediction value. A system for detecting anomalies for a database system may include a query optimizer, a feature modeler and an anomaly detector.

20 Claims, 10 Drawing Sheets

U.S. PATENT DOCUMENTS

| | | | |
|---|---|---|---|
| 2009/0234484 A1* | 9/2009 | Vacar et al. | 700/110 |
| 2009/0271662 A1* | 10/2009 | Tarta | 714/37 |
| 2009/0282480 A1* | 11/2009 | Lee et al. | 726/22 |
| 2010/0011366 A1* | 1/2010 | Gerovac et al. | 718/104 |
| 2010/0114865 A1* | 5/2010 | Gupta et al. | 707/713 |
| 2010/0198809 A1* | 8/2010 | Graefe et al. | 707/713 |
| 2010/0218031 A1* | 8/2010 | Agarwal et al. | 714/2 |
| 2010/0287214 A1* | 11/2010 | Narasayya et al. | 707/805 |
| 2010/0325132 A1* | 12/2010 | Liu et al. | 707/759 |
| 2011/0004935 A1* | 1/2011 | Moffie et al. | 726/23 |
| 2011/0010359 A1* | 1/2011 | Burger | 707/718 |
| 2011/0055237 A1* | 3/2011 | Veanes et al. | 707/759 |
| 2011/0126197 A1* | 5/2011 | Larsen et al. | 718/1 |
| 2011/0219446 A1* | 9/2011 | Ichnowski | 726/22 |
| 2011/0238781 A1* | 9/2011 | Okun et al. | 709/217 |

OTHER PUBLICATIONS

Cabrera, João et al., "Ensemble Methods for Anomaly Detection and Distributed Intrusion Detection in Mobile Ad-Hoc Networks", Information Fusion, vol. 9(1), 2008, pp. 96-119.

Cohen, William W., "Fast Effective Rule Induction", Machine Learning: The 12$^{th}$ International Conference, Morgan Kaufmann Publishers, Lake Tahoe, CA, 1995, 10 pages.

Cohen, William W., "Learning Trees and Rules with Set-Valued Features", Proceedings of AAAI/IAAI, vol. 1, 1996, pp. 709-716.

Fonseca, José, "Online Detection of Malicious Data Access Using DBMS Auditing", SAC, Fortaleza, Ceara, Brazil, 2008, pp. 1013-1020.

Frank, Eibe, "J48.java", Revision 1.9, The WEKA Data Mining Software, The University of Waikato, Hamilton, New Zealand, 1999, 8 pages.

Frank, Eibe, "RepTREE.java", Revision 5535, The WEKA Data Mining Software, The University of Waikato, Hamilton, New Zealand, 1999, 17 pages.

Hall, Mark et al., "The WEKA Data Mining Software: An Update", SIGKDD Explorations, vol. 11(1), http://www.cs.waikato.ac.nz/ml/weka/, 2009, pp. 10-18.

Hartigan, J.A., *Clustering Algorithms*, Department of Statistics, Yale University, John Wiley & Sons, Inc., 1975, 364 pages.

Hu, Yi and Brajendra Panda, "Identification of Malicious Transactions in Database Systems", IDEAS, Hong Kong, China, 2003, pp. 329-335.

Huang, Yi-an et al., "Cross-Feature Analysis for Detecting Ad-Hoc Routing Anomalies", Proceedings of the 23$^{rd}$ International Conference on Distributed Computing Systems, Providence, RI., 2003, 25 pages.

Huang, Yi-an, "Intrusion Detection and Response Systems for Mobile Ad Hoc Networks", Georgia Institute of Technology, Ph.D. Thesis, 2006, 181 pages.

Huang, Yi-an and Lee, Wenke, "A Cooperative Intrusion Detection System for Ad Hoc Networks", Proceedings of the 1$^{st}$ ACM Workshop on Security of Ad Hoc and Sensor Networks, 2003, pp. 135-147.

Kamra, Ashish et al., "Detecting Anomalous Access Patterns in Relational Databases", The VLDB Journal, vol. 17, 2008, pp. 1063-1077.

Knuth, Donald, *The Art of Computer Programming*, vol. 1 Fundamental Algorithms, 3$^{rd}$ Edition, Addison-Wesley, 1997, 681 pages.

Kohonen, Teuvo, "Self-Organized Formation of Topologically Correct Feature Maps", Biological Cybernetics, vol. 43, 1982, pp. 59-69.

Lanckriet, Gert R.G. et al., "Robust Novelty Detection with Single-Class MPM", Advances in Neural Information Processing Systems, 2002, 8 pages.

Lee, S.Y. et al., "Learning Fingerprints for a Database Intrusion Detection System", ESORICS, Zurich, Switzerland, 2002, pp. 264-280.

Liu, Yu et al., "A hybrid data mining anomaly detection technique in ad hoc networks", Proceedings of IJWMC, vol. 2(1), 2007, pp. 37-46.

Liu, Yu et al., "MAC Layer Anomaly Detection in Ad Hoc Networks", Proceedings of Sixth IEEE SMC Information Assurance Workshop, 2005, pp. 402-409.

Lloyd, Stuart P., "Least Square Quantization in PCM", Bell Telephone Laboratories Paper, 1957, published in IEEE Transactions on Information Theory, vol. IT-28, No. 2, Mar. 1982, pp. 129-137.

Mitchell, Tom M., *Machine Learning*, WCB/McGraw-Hill, Boston, Massachusetts, 1997, 431 pages.

Quinlan, Ross, *C4.5: Programs for Machine Learning*, Morgan Kaufmann Publishers, San Mateo, California, 1993, 308 pages.

Scholkopf, Bernhard et al., "Estimating the Support of a High-Dimensional Distribution", Microsoft Research, MSR-TR-99-87, Nov. 27, 1999, 31 pages.

Tax, D.M.J., "One-class classification", Delft University of Technology, Ph.D. Thesis, ISBM: 90-75691-05-x, 2001, 202 pages.

\* cited by examiner

200
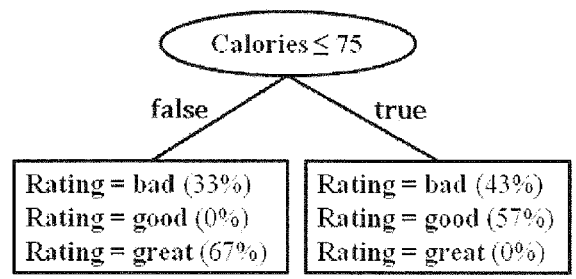
FIG. 2a) The Rating Submodel
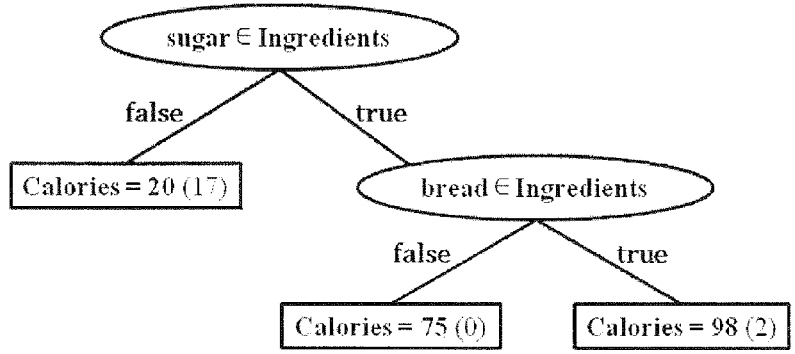
FIG. 2b) The Calories Submodel
Examples of Submodels

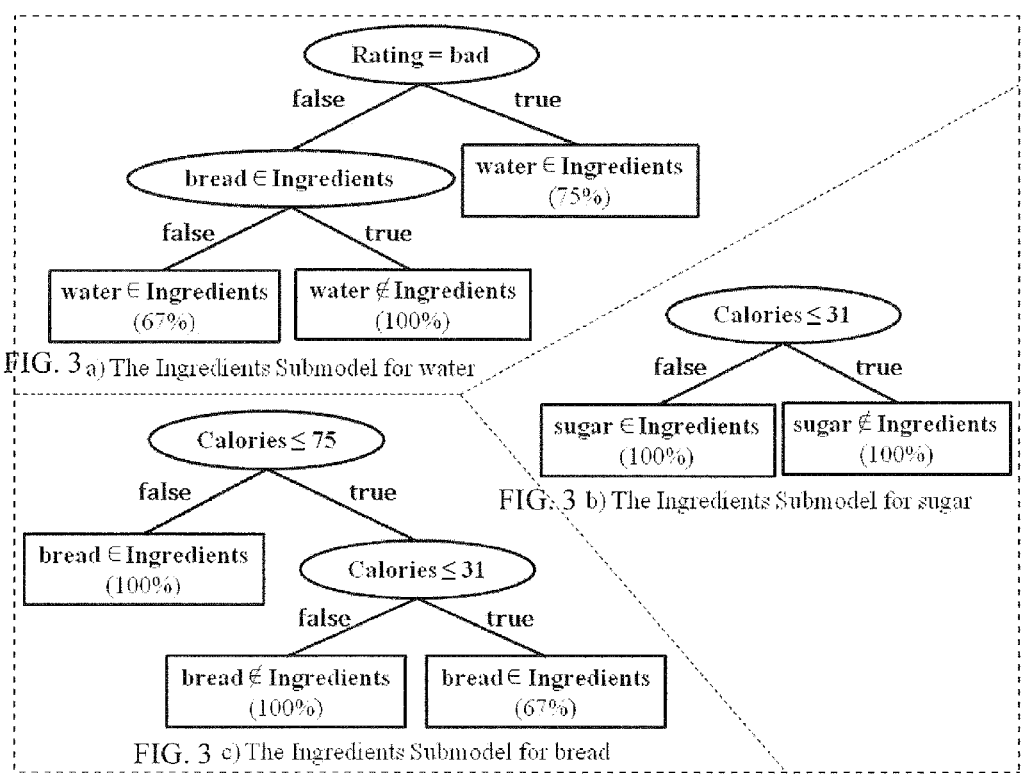
Examples of a Set-Valued Feature's Submodels

Training Phase of Cross-Feature Analysis

FIG. 7 a) The TouchSystemCatalog Submodel
FIG. 7 b) The ResultSize Submodel
FIG. 7 c) The SelectionOperator Submodel for TASK_NMBR

Some of the Submodels

ANOMALY DETECTION FOR DATABASE SYSTEMS

FIELD OF THE INVENTION

The present invention relates generally to database security.

BACKGROUND

Databases, such as relational database management systems (RDBMS), provide varying levels of security from database attacks. Database security has usually attempted to prevent malicious modifications to database content or prevent illegitimate data exfiltration (extraction of information from a database). However, database security has generally involved detecting attacks that are similar to past attacks. It is more difficult to detect novel attacks that are unlike attacks that have been experienced before. As database system vulnerabilities are discovered, new methods of attack are developed.

Some methods of database security apply application-phase analysis to transaction logs after the attacks have already succeeded. Query transaction logs may be mined for suspicious or anomalous behavior, but this basic approach is generally only able to identify attacks after the fact because the transaction information is not available until the transaction completes. Other methods of database security involve real time monitoring and rolling back database activity after anomaly detection. However, simple attacks that auto-commit cannot be thwarted.

Such approaches cannot detect exfiltration attacks that do not attempt to modify the database. Exfiltration attacks are read-only; no transaction is needed. Most update attacks rely on a single structured database query language (SQL) statement, for example, to modify a specific record or to drop a table. Assuming the normal workload contains single statement transactions, these techniques will either generate large numbers of false positives or miss many common attacks.

Database security measures can compare models of SQL queries to SQL queries of privileged users to detect an attack. Some measures have focused on exfiltration, automatically designing regular expressions that represent legitimate SQL queries. However, these measures are limited to analyzing table access and syntactic features of SQL queries, and attacks instigated by insiders can look similar to legitimate queries at a syntactic level.

Although security measures can protect against a wide range of SQL injection attacks, they offer limited protection against insider attacks, which do not rely on convoluted syntax to achieve the adversaries' goals. Other measures apply machine learning techniques to generate signatures of known legitimate or illegitimate SQL queries. However, many security measures rely heavily on the latter signatures, which results in either a) the false positive rate is quite high (to catch all illegitimate activity) or b) novel threats and insider threats are not detected. Furthermore, security rules are often generated by hand, or hand-tuned based on the applications that access the database. For many insider attacks, or slow exfiltration attacks, many custom rules would need to be generated.

BRIEF SUMMARY

Methods, systems and computer program product embodiments for detecting anomalies for a database system are provided. According to an embodiment, a method may include extracting workload features from a query optimizer based on a query workload and generating workload feature models for the extracted workload features. A workload may include, for instance, a set of legitimate queries. Feature models may include, for instance, a submodel and/or a feature vector. The method may also include extracting instance features from the query optimizer based on a query instance. Instance feature values may be obtained. The method may further include applying a query instance to the workload feature models to produce a prediction value for each workload feature. Anomalies may be reported based on a comparison of each instance feature value with the corresponding prediction value.

A system for detecting anomalies for a database system may include a query optimizer configured to execute queries, according to an embodiment. The system may also include a feature modeler configured to extract workload features from the query optimizer based on a query workload and generate workload feature models for extracted workload features. The feature modeler may also be configured to extract instance features from the query optimizer based on a query instance. Instance feature values may be obtained. The system may further include an anomaly detector configured to apply a query instance to the workload feature models to produce a prediction value for each workload feature model. Anomalies may be reported based on a comparison of each instance feature value with the corresponding prediction value.

According to another embodiment, computer program product may have control logic stored therein. The control logic may enable a processor to detect anomalies for a database system. The control logic may include first computer readable program code means for enabling a processor to extract workload features from the query optimizer based on a query workload. The control logic may also include second computer readable program code means for enabling a processor to generate workload feature models for the extracted workload features and third computer readable program code means for enabling a processor to extract instance features from the query optimizer based on a query instance. Instance feature values may be obtained. The control logic may further include fourth computer readable program code means for enabling a processor to apply a query instance to the workload feature models to produce a prediction value for each workload feature model. The control logic may also include fifth computer readable program code means for enabling a processor to report anomalies based on a comparison of each instance feature value with a corresponding prediction value. Further embodiments, features, and advantages of the present invention, as well as the structure and operation of the various embodiments of the present invention, are described in detail below with reference to the accompanying drawings.

BRIEF DESCRIPTION OF THE FIGURES

The accompanying drawings, which are incorporated herein and form a part of the specification, illustrate embodiments of the present invention and, together with the description, further serve to explain the principles of the invention and to enable a person skilled in the pertinent art to make and use the invention.

FIGS. 2A-B illustrate exemplary submodels.

FIGS. 3A-C illustrate examples of set-valued feature submodels.

The present invention will be described with reference to the accompanying drawings. The drawing in which an element first appears is typically indicated by the leftmost digit(s) in the corresponding reference number.

DETAILED DESCRIPTION

Introduction

Figure 1:
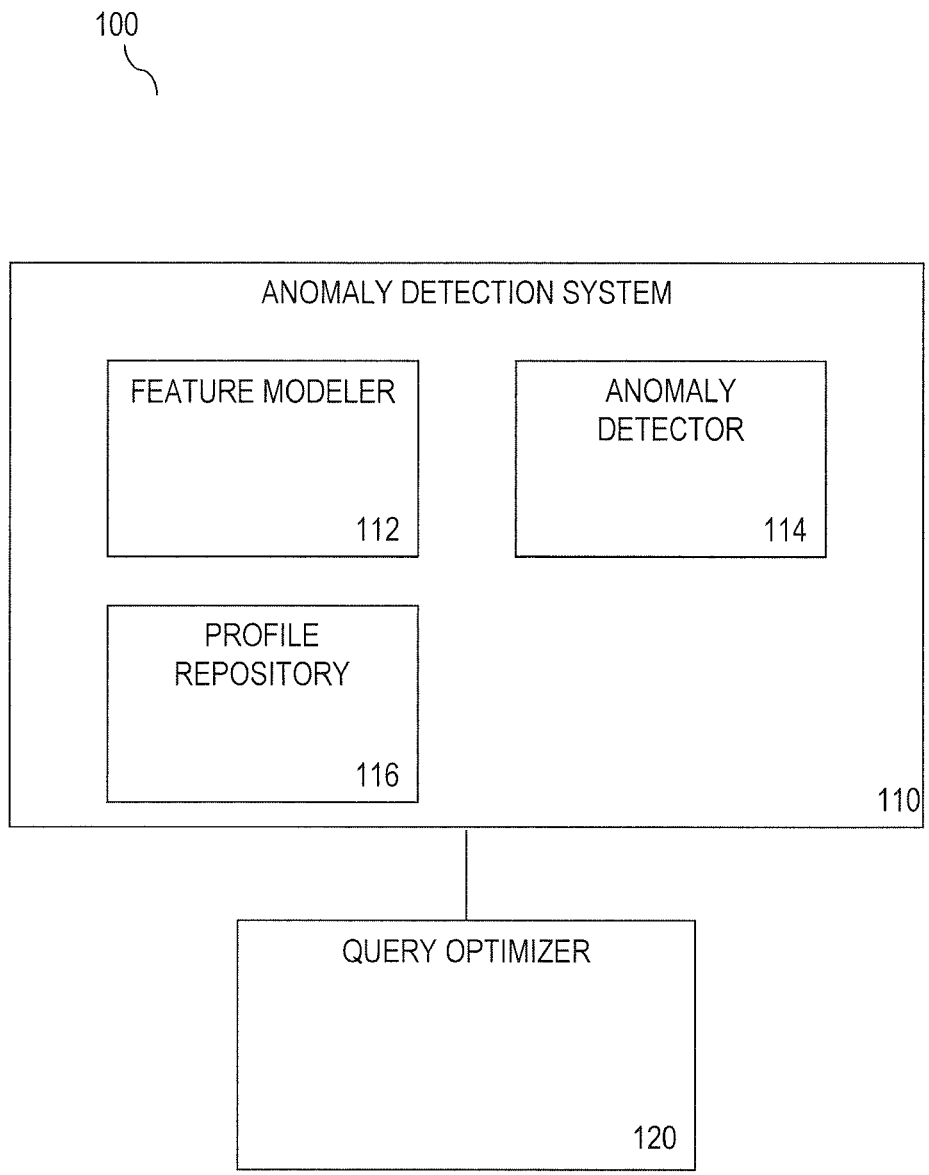
FIG. 1 illustrates a system for detecting anomalies for a database system, according to an embodiment of the present invention.

Databases, such as a relational database management system (RDBMS), provide varying levels of security from unauthorized access. Database security generally involves checking for attacks that are similar to those seen in the past. However, new methods of attack are constantly developed as new database vulnerabilities are discovered. While it is necessary to block known attack strategies, it is also necessary to focus on catching attacks that are unlike any that have been seen before, which is far more difficult.

Embodiments of the present invention are directed to detecting anomalous query behavior. For example, detecting anomalous behavior may include generating profiles of legitimate (expected) query behavior based on either a) query logs of known legitimate queries and/or b) query logs generated for performance testing. A set of legitimate queries may also be referred to as a query workload. In an example offline (pre-processing) step, each query of a query workload may proceed through a relational database engine's query optimizer to extract a wide range of query features, such as the expected result size, the complexity (e.g., how many operations) of the query, and which attributes appear in the query. Feature models may be built for extracted workload features. For example, a decision tree may be constructed for each extracted workload feature, based on all of the remaining features.

In an example online process, incoming queries or query instances may be processed through the query optimizer to extract the same set of features. Using feature models generated in the previous step, each extracted workload feature may be predicted. For instance, if all of the features are correctly predicted, the query is classified as legitimate. However, the more features that are incorrectly predicted, the more anomalous the query.

Embodiments of an anomaly detection system are described below and overcome many of the deficiencies of current security systems. The anomaly detection system may operate at a deeper level within the database query processing stack. As a result, in an embodiment, more fine-grained features are extracted based on the syntax of the query and its semantics. For example, syntactically, emp_id='31346' is very similar to emp_id>'31346', but the optimizer will potentially produce different access plans for these queries (one using an index scan, the other a table scan) and will certainly estimate different result sizes. In most cases, the optimizer will recognize that the first query can only return a single record because emp_id is a key. Thus, existing security systems may be good at generally detecting SQL injection attacks, but may not be very good at detecting insider threats.

Some security measures involve rules that are often generated by hand, or hand-tuned based on the applications that access the database. By analyzing the output of the query optimizer, this technology provides a more effective way to generate rules that security systems rely on.

Although some measures can protect against a wide range of SQL injection attacks, they offer limited protection against insider attacks, which do not rely on convoluted syntax to achieve the adversaries' goals. Because small changes in SQL syntax can create large changes in the query plan, techniques described below may be more sensitive than those based on parsing.

Previous security measures have not considered extracting features from the query optimizer. Instead, most vendor tools analyze SQL statements directly to look for anomalies and extract patterns from logs that are generated after a query has been processed. Aspects of the invention provide for preventing a query from being processed by the query engine. Moreover, these approaches may benefit from all of the work performed by the query optimizer and the cross-feature analysis of features extracted from the query optimizer.

The anomaly detection system may augment existing products with a novel approach that can be deployed in conjunction with existing database activity monitoring (DAM) products, according to an embodiment. This technology may also be directly imbedded into query engines. Additionally, this technology may be included as part of a monitoring suite. Beneficiaries of this technology include administrators of relational database systems, who can use this technology to more easily protect their systems from unexpected attacks or attacks launched by privileged insiders.

Exemplary Anomaly Detection System

FIG. 1 illustrates an example system 100 for detecting anomalies for a database system, according to an embodiment. Anomaly detection system 110 includes feature modeler 112, anomaly detector 114 and profile repository 116. Anomaly detection system 110 may be implemented in a query engine or may be implemented in coordination with a query engine. Anomaly detection system 110 may be located in a database system. Anomaly detection system 110 may be a computing device or software/firmware executed in a computing device. Examples of computing devices include, but are not limited to, a computer, workstation, distributed computing system, computer cluster, embedded system, stand-alone electronic device, networked device, mobile device (e.g. mobile phone, smart phone or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory and graphical user interface display.

Anomaly detection system 110 may be coupled to query optimizer 120, a component of a database system that determines the most efficient way to execute a database query. Feature modeler 112 may be configured to extract one or more features from the query optimizer. Workload features may be extracted based on a query workload. Extracted features may include numerical, categorical or set-value feature types. Features may also include features such as expected result size, the complexity of the query, or which attributes appear in the query. Feature modeler 112 may also generate feature models for the extracted features. For example, a decision tree may be generated for each of the extracted features. Example feature models, such as submodels 200 and 300, are shown in FIGS. 2 and 3.

Various features may be extracted from a query optimizer. Features may include, for instance, database relations referenced by a query or a number of columns returned by a query. In some cases, features may include names of any attributes returned by the query or any names of attributes that determine which results to return. In other cases, features may include a number of group-by, distinct, or order-by statements in the query. Other examples include an expected time needed to return a first result or to return all results. Further examples include an expected number of results returned or an expected size of each result returned. Another example feature may be an access plan for a table. A feature may also be a number of records expected to be read from a table. The example features mentioned above are illustrative of some features that may be extracted from a query optimizer and are not meant to be limited to only these features or to any particular combination of features.

Feature modeler 112 may be configured to generate feature models in order to determine a feature model for each of the extracted features, according to an embodiment. A submodel may be built for each feature by treating that feature as the class to be predicted.

According to a further embodiment, feature modeler 112 may be configured to analyze submodels to determine whether they are consistent (legitimate) or anomalous (suspicious). In some cases, by setting a limit on the number of submodels that reject an instance, legitimate instances may be distinguished from attacks with up to perfect (100%) recall of real attacks and a specificity of 99.9% on legitimate instances. Feature modeler 112 may be configured to extract instance features from a query optimizer based on a query instance. Feature modeler 112 may also observe or obtain instance feature values corresponding with the extracted instance features. Anomaly detector 114 may be configured to apply a query instance to the workload feature models to determine a prediction value for each workload feature model. Anomaly detector 114 may be configured to report, or provide for reporting, anomalies based on a comparison of observed instance feature values with corresponding prediction values.

Cross-feature analysis (CFA) is a novelty discovery method that can be applied to database security and accommodate heterogeneous features, including categorical type features. Feature modeler 112 is configured to perform cross-feature analysis for features extracted from the query optimizer Like people who are trained to discern counterfeit currency by learning characteristics of real authentic money, CFA develops a profile of legitimate database activity, anticipating that most attacks will not fit the profile well. Training data may lack positive instances, so CFA may be used to transform a novelty discovery problem into multiple supervised machine learning problems. One submodel may be built for each feature by treating that feature as the class, according to an embodiment. Then, in the application phase, a new query instance may proceed through each of the submodels, and if many of the submodels' predictions agree with the instance's feature values, the instance is labeled as negative for anomalies. However, if the instance does not fit the profile defined by the submodels, this suggests it is different from the training data of negative instances, so it is labeled as positive for anomalies.

Feature modeler 112 may train query profiles or query workloads based on the extensive logs of daily operations that a database retains, which include thousands of user-submitted SQL queries, according to an embodiment. Since there are probably very few, if any, attacks in training data, the assumption could be made that all of the training instances are negative. Supervised learning methods might not be used because they require that all classes be represented in the training data. Some supervised machine learning methods have been modified to deal with this novelty detection problem, including Support Vector Machines. Other novelty detection approaches include Minimax Probability Machines, Median of Absolute Derivations, k-Means Clustering, k-Centers Clustering (also known as k-Medoids Clustering), k-Nearest Neighbor, Neural Networks, Self-Organizing Maps, Support Vector Data Description, Principal Component Analysis (PCA) and mixtures of PCAs, Learning Vector Quantization, the Gaussian model and Mixture of Gaussians, the Parzen Density Estimators, Auto-Encoders, and Diabolo Networks. But unfortunately, these approaches require the developer to define a measure for the distance from an object to the target class (represented by a training set). In other words, these novelty detection methods require the researcher to derive a formula that specifies the distance between a new query instance and the model that represents the training data.

Feature Types

A feature set may have a variety of feature types, including numerical features, categorical features, and set-valued features. Developing distance metrics for heterogeneous features is very difficult, because the features must be weighted so that they are somehow consistent.

For example, it may difficult to decide which of the following distances is the largest: a) the distance between 1 and 2 pounds, b) the distance between $10 and $20, c) the distance between a rose and a carnation, or d) the distance between the poker hands {ace of hearts, king of hearts} and {2 of spades, 2 of clubs}. Because this is so challenging, any of the distance-based methods listed above might not be used.

Categorical-type feature models may be generated using Cross-Feature Analysis, according to an embodiment. Cross-Feature Analysis (CFA) is a novelty detection technique that can learn from data with heterogeneous features but does not require that a distance metric be defined. CFA transforms a novelty detection problem into a supervised machine learning problem so that Decision Trees, Support Vector Machines, Neural Networks, Transformation-Based Learning or any other supervised machine learning algorithm may be used. An example of a non-limiting embodiment of CFA is also described in US Patent Pub. No. 2005/0283511 of Fan et al., which is herein incorporated by reference in its entirety. Embodiments of the present invention may use CFA to generate feature models of features extracted from a query optimizer. Example uses of CFA for categorical-type features are provided below.

Figure 4:
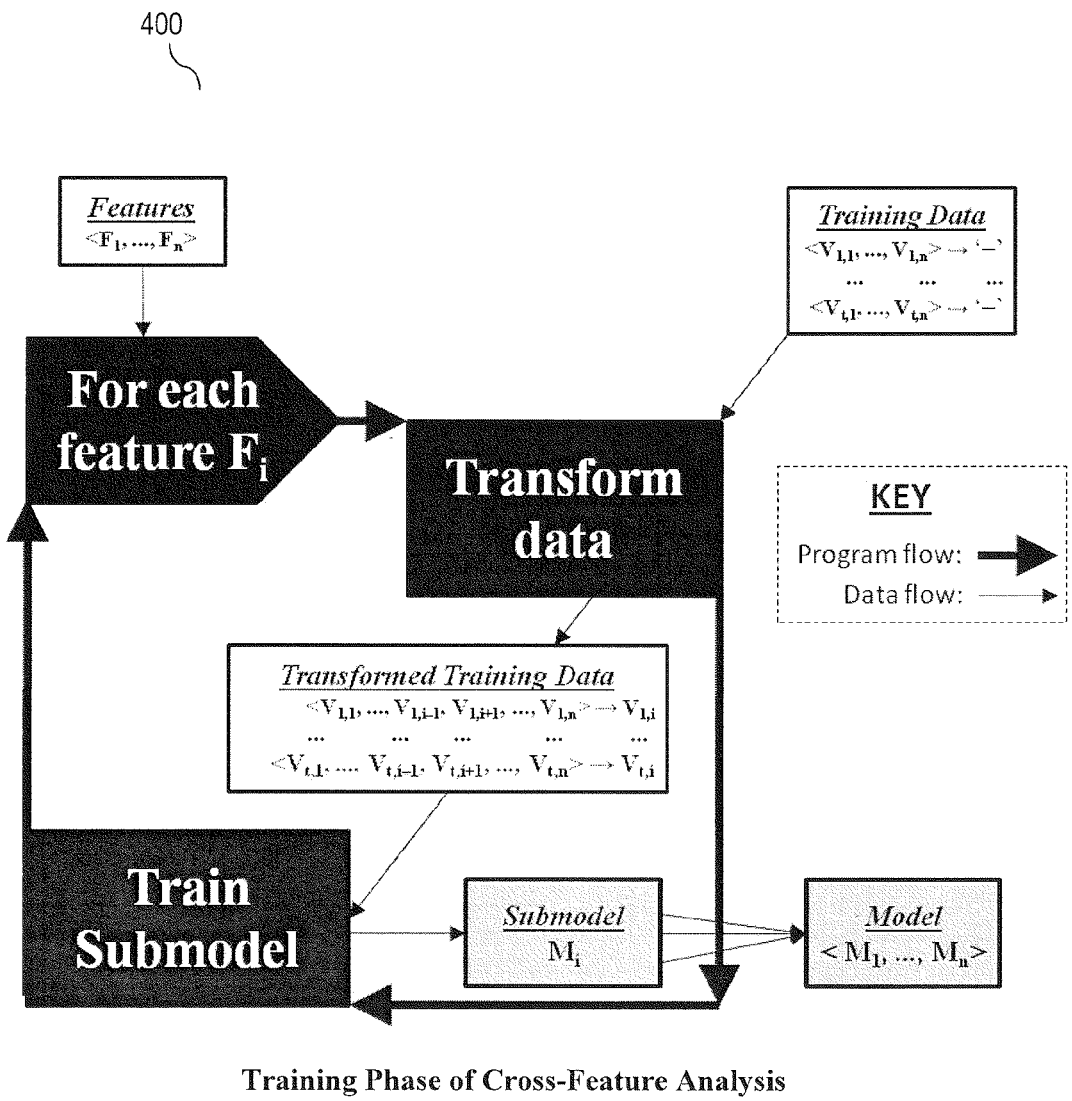
FIG. 4 illustrates a diagram of a training phase of cross-feature analysis, according to an embodiment.

CFA involves a training phase. A CFA training algorithm, presented in FIG. 4, is a loop that runs through all of the features, $<F_1, \ldots, F_n>$, according to an embodiment. For each feature $F_i$, the training data is transformed so that $F_i$ becomes the class. In other words, for each training example, $<V_1, \ldots, V_n> \rightarrow$ '—', the value of $F_i$, $V_i$, is removed from the feature vector to replace the class '—', effectively transforming the training instance into $<V_1, \ldots, V_{i-1}, V_{i+1}, \ldots, V_n> \rightarrow V_i$. As a result, a supervised machine learning algorithm can be trained on the transformed data to produce a submodel, $M_i$. The final learned model is a list of all of the submodels, $<M_1, \ldots, M_n>$.

As an example, consider the training data in Table 1. There are three features: 1) a categorical feature called Rating with three possible values, bad, good, and great, 2) a numerical feature called Calories, and 3) a set-valued feature called Ingredients with values that are subsets of {water, sugar, bread}.

TABLE 1

Example Training Data

| Ingredients | Calories | Rating |
|---|---|---|
| {water} | 0 | good |
| {water, sugar} | 75 | bad |
| {water, sugar} | 75 | good |
| {water, sugar, bread} | 100 | bad |
| {water, bread} | 31 | bad |
| {sugar} | 75 | bad |
| {sugar} | 75 | good |
| {sugar, bread} | 96 | great |
| {sugar, bread} | 98 | great |
| {bread} | 29 | good |

For this exemplary training data, the learned model might be that depicted in FIGS. 2 and 3. The submodel in FIG. 2a is a decision tree that predicts the categorical feature, Rating, suggesting that it is related to Calories. Apparently, high-calorie food tends to be great, while low-calorie food is only good. The numbers in parentheses give the percentage of the training data that reached each leaf with each value of Rating, showing that the error in this decision tree is pretty high. As FIG. 2a is a categorical feature type (i.e., "good", "great" or "bad"), CFA may be used.

The submodel in FIG. 2b is a regression tree where each leaf specifies a value for the Calories feature with its standard deviation given in parentheses. A set-valued feature is split into multiple boolean features, one for each possible member in the feature's values. Each new feature is true if and only if the corresponding member is in the original feature's value. In the example, three submodels are learned for the Ingredients feature: one for water (FIG. 3a), one for sugar (FIG. 3b), and one for bread (FIG. 3c).

Application Algorithms

Anomaly detector 114 may be configured to apply a query instance to workload feature models to produce a feature value for each workload feature model, according to an embodiment. Anomaly detector may also be configured to report one or more anomalies based on a comparison of each observed instance feature value with a corresponding prediction value. In some cases, a comparison may result in a simple yes or no result.

There are at least two different algorithms that may be used in the application phase, Average Match Count and Average Probability. These algorithms may work for categorical features or numerical features.

Figure 5:
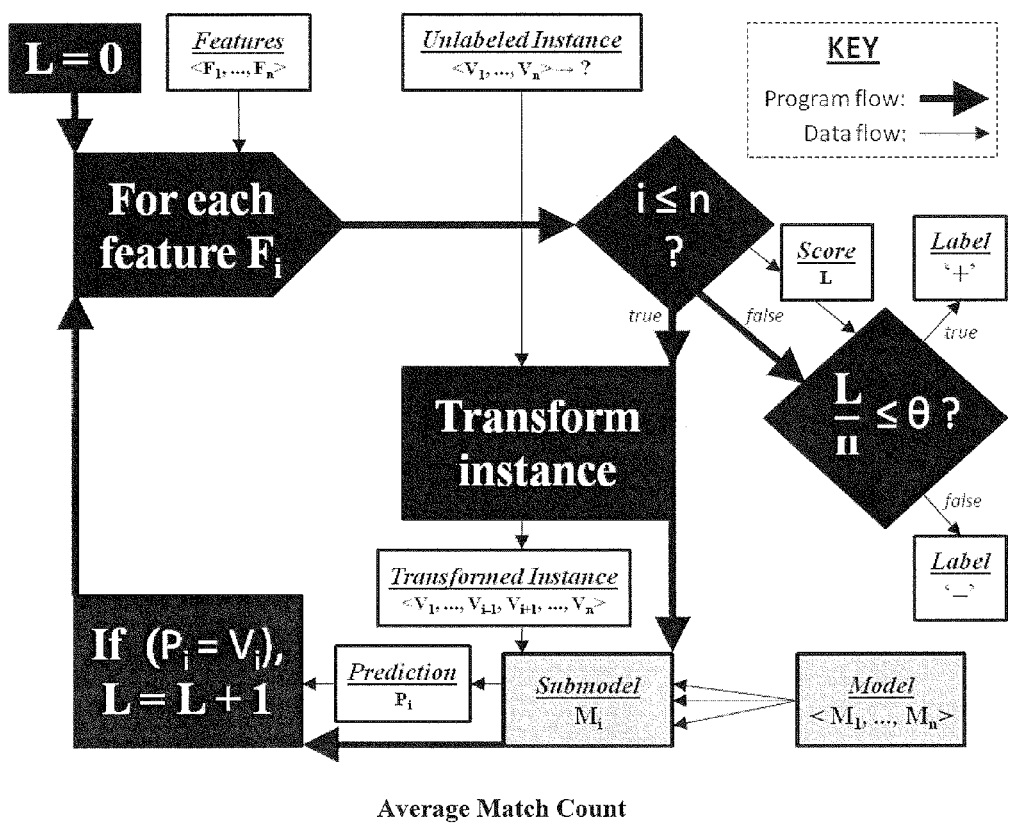
FIG. 5 illustrates a diagram of an average match count algorithm, according to an embodiment.

FIG. 5 shows an Average Match Count algorithm, according to an embodiment. The percentage of submodels that accurately predict a given unlabeled query instance's feature values may be compared with a predetermined threshold to choose the label for the instance. In other words, for each feature $F_i$, a given unlabeled instance, $<V_1, \ldots, V_n> \rightarrow ?$, is transformed by the same process as that in the training phase so that it can be processed by submodel $M_i$. The instance's legitimacy score L is increased by 1 point if and only if $M_i$ correctly predicts the feature's value that the instance actually has, $V_i$. After performing this for all of the features, L is divided by the number of submodels, n, and that average legitimacy score is compared with a threshold θ to determine the label for the instance. An instance that receives a high average legitimacy score $$\left(\frac{L}{n} > \theta\right)$$

is labeled '−' (the SQL query is legitimate), and an instance with a low average legitimacy score $$\left(\frac{L}{n} \leq \theta\right)$$

is labeled '+' (the SQL query is suspicious).

For example, suppose the unlabeled instance, <good, 42, {water, sugar}>, is presented to the model in FIGS. 2 and 3. The Rating submodel (FIG. 2a) predicts that the Rating is good, and since that is true for the unlabeled instance, a point is added to L. The Calories submodel predicts that the instance should have Calories=75, but it actually has Calories=42, so L is unchanged by that submodel. Continuing, the three decision trees in FIG. 3 predict that Ingredients has water and sugar but not bread, all of which are true. So the average legitimacy score for this instance is $$\frac{L}{n} = \frac{1+0+1+1+1}{5} = 80\%.$$

If θ=50%, then this instance is labeled '−'.

As another example, the instance <bad, 100, {bread}> is consistent with only one of the submodels, the Ingredients submodel for bread. So $$\frac{L}{n} = \frac{0+0+1+0+0}{5} = 20\%,$$

and with a threshold of θ=50%, the instance is labeled '+'.

Figure 6:
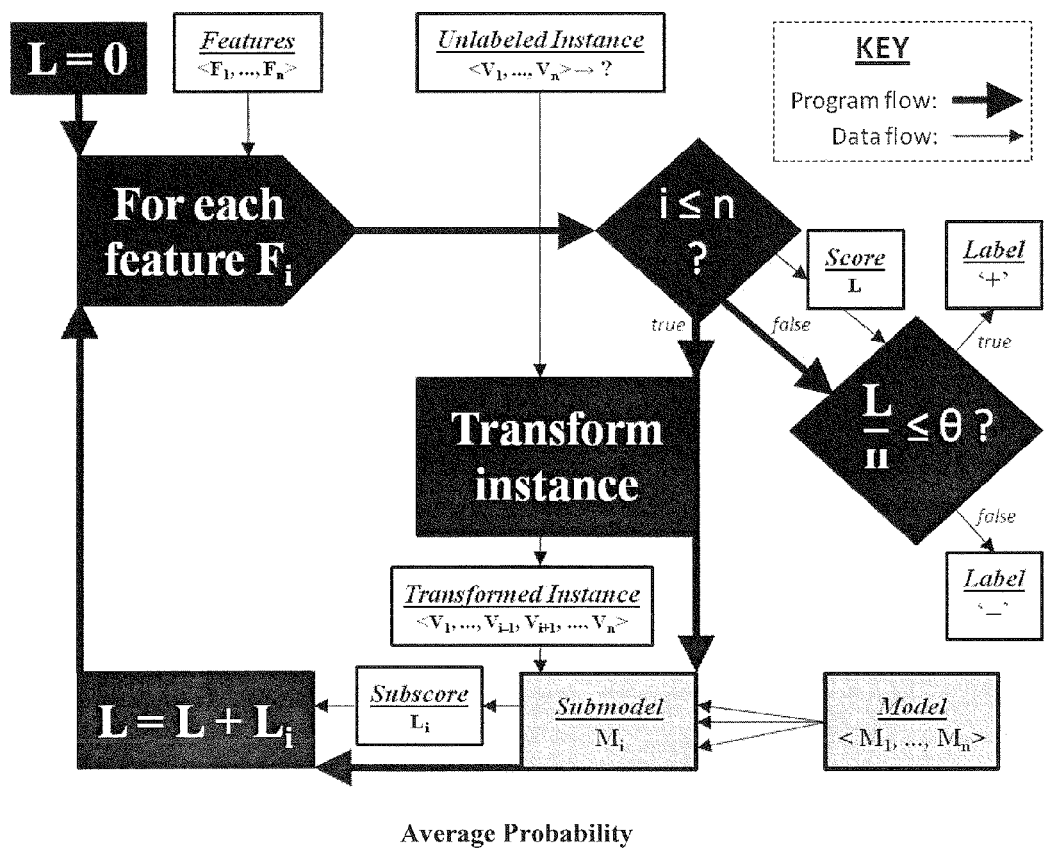
FIG. 6 illustrates a diagram of an average probability algorithm, according to an embodiment.

If the supervised machine learning method can return distributions of class values, there is another option for the application phase procedure. The Average Probability algorithm is shown in FIG. 6, according to an embodiment. It is similar to the Average Match Count algorithm (FIG. 5), except that instead of awarding 1 point for each submodel that agrees with the given instance and 0 points otherwise, the legitimacy score is increased by the probability that each submodel assigns to the value that the instance has for the corresponding feature. In other words, given an unlabeled instance, $<V_1, \ldots, V_n> \rightarrow ?$, for each feature $F_i$, submodel $M_i$ returns a probability for each possible value of $F_i$, and the probability $L_i$ that it returns for the class value $V_i$ is added to the legitimacy score L.

Returning to the example, if the Average Probability algorithm is run on the unlabeled instance, <good, 42, {water, sugar}>, then the Rating submodel (FIG. 2a) credits the instance with $L_1$=57% for its Rating value, good. The three Ingredients submodels (FIG. 3) give it legitimacy subscores of $L_3$=67%, $L_4$=100%, and $L_5$=100% for water, sugar, and bread, respectively. And the regression submodel, Calories, (FIG. 2b) returns a legitimacy subscore of $L_2$=0% using a procedure that will be shown later. Thus, the average legitimacy score assigned to the instance is $$\frac{L}{n} = \frac{57\% + 0\% + 67\% + 100\% + 100\%}{5} = 65\%.$$

So, with a threshold of θ=50%, this instance is assigned the label '−'. And for the other example instance, <bad, 100, {bread}>, $$\frac{L}{n} = \frac{33\% + 3\% + 25\% + 0\% + 100\%}{5} = 32\%,$$

so if θ=50%, this instance is assigned the label '+'.

Different supervised machine learning methods may be used, depending on the type of feature treated as the class. CFA may perform better with decision trees in comparison with other supervised machine learning algorithms, so, for some embodiments having non-numerical (categorical, boolean, and set-valued) classes, decision trees may be used. For numerical classes (including dates and times), regression trees may be used. Example implementations include a J48 Decision Trees algorithm and a REPTree Regression Trees algorithm. Both of these supervised machine learning algorithms can easily handle various types of features, unlike other novelty detection methods. Parameter settings may require, for instance, at least 5 instances at each leaf (when possible), applying reduced-error pruning with 10 folds, and permitting the decision trees to have binary splits.

In an embodiment, features may be selected through an analysis of known attacks and discussions with database security experts. For example, Table 5 lists some of the features that may be used for a data set.

TABLE 5

Example Features

| Name | Type |
|---|---|
| ResultSize | numerical |
| CostOfExplainPlan | numerical |
| TouchSystemCatalog | boolean (categorical) |
| SelectionOperator | set-valued |
| AccessMethodAppliedFor<tableName> | categorical |
| Timestamp | date (numerical) |
| NumberOfConjunctions | numerical |

A variety of feature types are included in the exemplary table above: numerical features (including a date-valued feature), categorical features (including boolean features), and set-valued features. ResultSize is an integer that estimates the quantity of data that should satisfy the SQL query's requirements, and CostOfExplainPlan is an integer that estimates the relative amount of time required to respond to the SQL query. TouchSystemCatalog is a categorical (more specifically, boolean) feature that specifies whether the database system catalog is being accessed (which should rarely happen). The value of SelectionOperator is a set containing the names of the columns that the SQL query is requesting. The AccessMethodAppliedFor<tableName> feature is actually a template that expands into multiple categorical features, one for each table in the database.

There are different ways that numerical features might be handled. For example, numerical features may be transformed into categorical features by creating a finite number of buckets, each of which represents a different range of values. However, bucketing loses information about the ordering of values, both between and within buckets. Also, it is not clear how to determine the number of buckets and their ranges. Multiple linear regression can handle numeric features by defining the difference between the true value, V, and the predicted value, P, to be $$\left| \log \frac{P}{V} \right|.$$

However, a function with a range of [0,1] rather than [0,∞) may be more desirable. Since the REPTree algorithm maintains a record of the variance of the training data at each leaf, this information may be used, according to an embodiment. For the Average Match Count method, an instance's legitimacy score L may be increased by 1 point if it is within 2 standard deviations (a deviation is the square root of the variance) of the mean. For Average Probability, Chebyshev formula $$\left( \frac{|V - P|}{\sigma} \right)^{-2}$$

may use modified [Knuth, 1997], $$\left( \frac{|V - P|}{\sigma} + 1 \right)^{-2},$$

where σ is the standard deviation at the leaf that was reached when traversing the regression tree. This modification may insure that its value is between 0 and 1.

Application phase algorithms may require a threshold that can be used to separate positive instances from negative instances. Determining the value of the threshold manually is difficult, so it may be performed automatically, according to an embodiment. In some cases, the threshold may be automatically set to the highest value for which the specificity on a held-out tuning set was at least 99%.

In the application phase, it is possible to encounter an instance with an unseen value, which is a value of a categorical feature or a member of a set-valued feature's value that was not found in the training data. Certainly unseen values are suspicious, but with a limited quantity of training data, it is possible for legitimate instances to have unseen values. So, instead of automatically labeling an instance with any unseen values as positive, a more conservative approach may be taken and each instance may be assigned a legitimacy sub-score of 0 for each submodel in which the class has an unseen value, according to an embodiment. In the case of an unseen value in a set-valued feature's value, an extra 0 may be averaged into the final legitimacy score, as if there was another submodel to predict the unseen value. Also, any submodel whose decision tree cannot be traversed to a leaf, because it reaches a branching node that has no option for the unseen value, may return a legitimacy subscore of 0.

For example, using a Average Match Count algorithm with the model in FIGS. 2 and 3, the instance, <excellent, 101, {sugar, bread}>, in which the Rating, excellent, is an unseen value, receives the average legitimacy score $$\frac{0 + 1 + 1 + 1 + 1}{5} = 80\%,$$

and so, if the threshold θ=50%, then this instance is labeled '−', despite its unseen value. Note that a binary branch like the one at the root of FIG. 3a can still be traversed, even though the feature it is testing, Rating, has an unseen value. This is because its question, "Rating=bad?" can still be answered false, despite the unseen value. As another example, for the instance <bad, 54, {water, eggplant}>, an imaginary submodel for the unseen member of Ingredients, eggplant, produces a legitimacy score of 0, so the average legitimacy score is $$\frac{0+1+1+0+1+0}{6} = 50\%.$$

Figure 7:
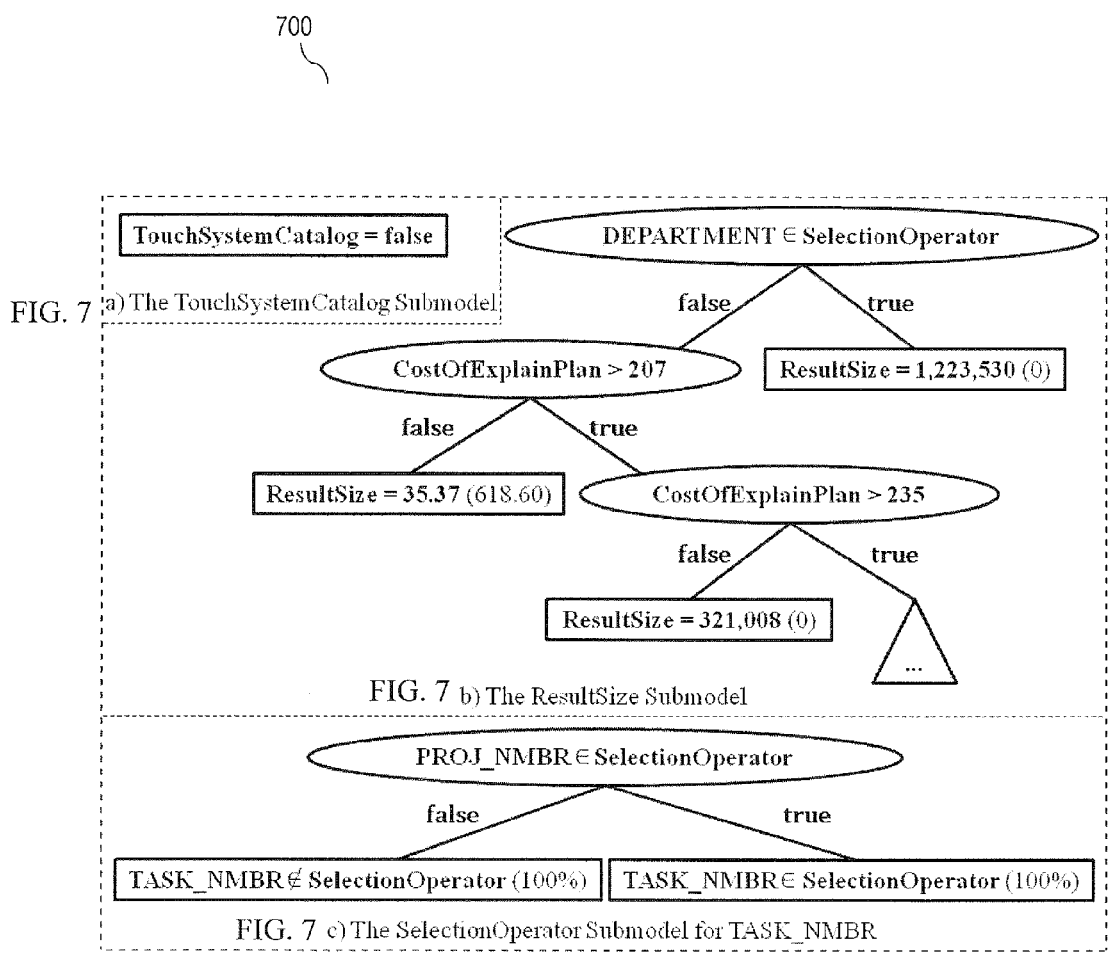
FIGS. 7A-C illustrate exemplary submodels, according to an embodiment.
Figure 8:
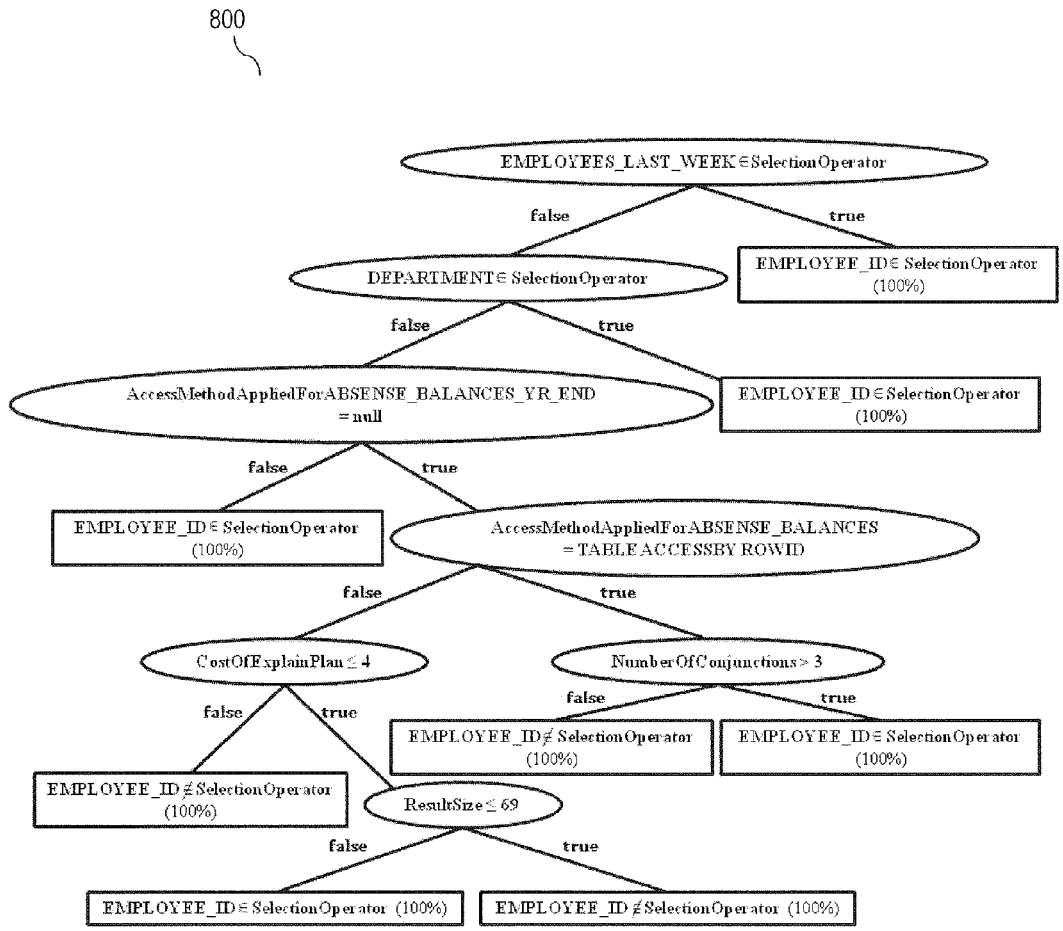
FIG. 8 illustrates exemplary submodels, according to an embodiment.

FIGS. 7 and 8 show further examples of submodels. The submodel in FIG. 7a is a decision tree that predicts the value of the boolean feature, TouchSystemCatalog, a one-node tree that correctly predicts that the system catalog is never accessed. A regression tree that predicts ResultSize, a numerical feature, is shown in FIG. 7b. (As in FIG. 2b, the numbers in parentheses give the standard deviation at each leaf.) The SelectionOperator feature, being a set-valued feature, is split into one tree for each of its values. FIGS. 7c and 8 show two of these submodels, which predict whether the SQL query asks for the values of TASK_NMBR and EMPLOYEE_ID, respectively.

Set-valued features may be transformed into categorical features by replacing them with boolean features, one for each value that can occur in the features' sets. Consequently, the learned model has multiple submodels for each set-valued feature. As weights are not assigned to the submodels, a set-valued feature has more influence on the average legitimacy score than any categorical or numerical feature. This might not be desirable. One way to eliminate this imbalance is to average the legitimacy subscores from its submodels for each set-valued feature before averaging them with the rest of the subscores, according to an embodiment. That would change the average legitimacy score, for example, <good, 42, {water, sugar}>, from $$\frac{1+0+1+1+1}{5} = 80\% \text{ to } \frac{1+0+[(1+1+1)/3]}{3} = 67\%,$$

and the average legitimacy score of a second example, <bad, 100, {bread}>, would change from $$\frac{0+0+1+0+0}{5} = 20\% \text{ to } \frac{0+0+[(1+0+0)/3]}{3} = 11\%.$$

Each member of a set-valued feature's values is as important as any categorical or numerical feature. In a further embodiment, instances with unseen values may be penalized. An unseen value would seem to be a strong indicator of an attack and an instance with unseen values may be automatically labeled as positive. In another embodiment, rather than using averages, low probabilities (such as <5%) may be counted.

A limit on the number of submodels that may reject a given instance may be set, according to an embodiment. For example, a submodel may reject or report an instance if one of three things happens: 1) The instance has an unseen value that causes the submodel to return a legitimacy subscore of 0, 2) for Decision Trees, the submodel returns a value that differs from the value of the corresponding feature in the instance, or, 3) for Regression Trees, the value of the corresponding feature in the instance is not within 2 standard deviations of the value that the submodel returns. In some cases, submodels may be viewed as monitors that each independently flag suspicious SQL queries, and if enough flags are raised, then the SQL query is declared to be suspicious. Independent monitors may significantly improve specificity if M is high enough. In some cases, a detection system may account for changes in the values of legitimate feature vectors over time. In other cases, the value of M may be set to a maximum number of submodels that may reject an instance. This value may be based on the number of features, among other things.

Exemplary Anomaly Detection Method

Figure 9:
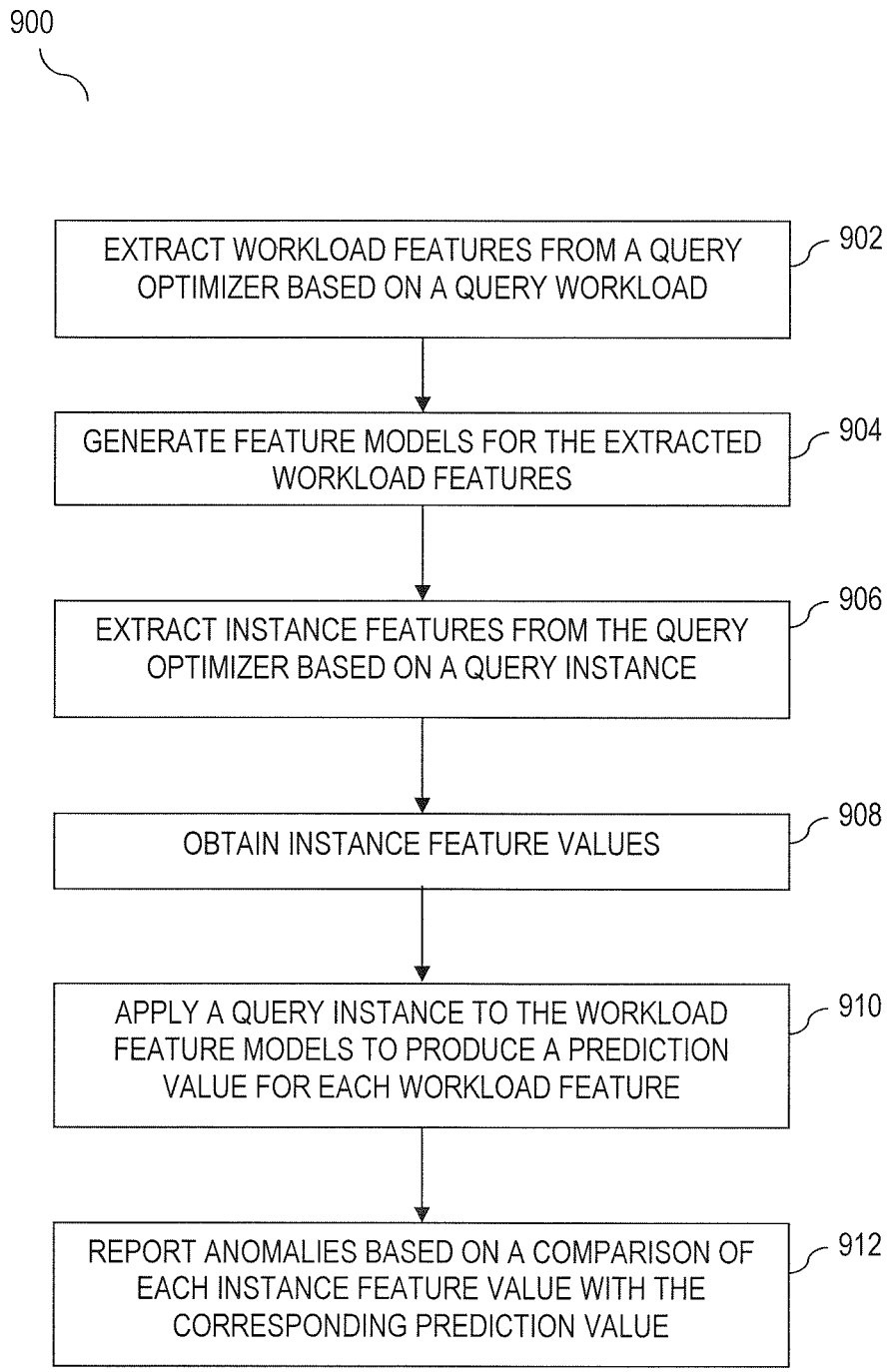
FIG. 9 is a process flowchart that illustrates a method for detecting anomalies for a database system, according to an embodiment.

FIG. 9 shows an example flowchart of a method 900 for detecting anomalies in a database system, according to an embodiment. In step 902, workload features may be extracted from a query optimizer based on a query workload provided to the query optimizer. A query workload may include query logs of known legitimate queries or query logs generated for performance testing. In some cases, workloads or profiles may be stored in a profile repository in or coupled to the database system, such as profile repository 116 shown in FIG. 1. While method 900 is described with respect to an embodiment of the present invention, method 900 is not meant to be limited to system 100.

Extracting features from a query optimizer may potentially prevent an anomalous query from being processed by the query engine. The query optimizer is the last stop before work is performed on the database. Moreover, this approach leverages the work performed by the query optimizer with a relational database system. The query optimizer has access to internal statistics such as the number of records, the length of a query, or the class of a query. Query optimizers may also determine if a batch of records will be returned.

In step 904, feature models may be generated for the extracted features, including workload features. For example, submodels, such as decision trees or regression trees, may be developed for each extracted feature. Examples of submodels are provided in FIGS. 2, 3, 7 and 8. Each extracted feature may be treated as a class.

In step 906, instance features may be extracted based on a query instance that is provided to the query optimizer. Instance feature values may also be obtained from the features extracted from the query optimizer in step 908. Steps 902-908 may be performed with feature modeler 112 of exemplary system 100.

In step 910, a query instance may be applied to the workload feature models to produce a predicted feature value for each workload feature model. A class may also be predicted for each feature vector. In some cases, CFA may be used to learn from data with heterogeneous features and no positive training instances. Supervised machine learning algorithms may be used to predict each feature's value from the values of the other features. By basing an instance's label on the number of submodels that reject each instance, detection system may distinguish between positive and negative instances with a recall of 97.2%-100% and a specificity of 99.9%.

In step 912, each observed instance feature value may be compared with the corresponding prediction value and detected anomalies may be reported. Thresholds may be used. For example, a query instance may be classified as legitimate based on a number of correct predictions. According to a further embodiment, a rejection count number may be determined based on a number of feature values that do not meet a threshold value for a corresponding prediction. Anomalies may be reported before the query instance is applied to the database system. Steps 910-912 may be performed by anomaly detector 114 of exemplary system 100.

A database owner may control a monitoring sub-system by setting two parameters, according to certain embodiments. 1) Any queries for which a sufficient number of features are correctly predicted will be classified as legitimate and processed normally. 2) Any queries for which too many features are incorrectly predicted will be classified as illegitimate and the database connection is closed. 3) For queries that fall between these extremes, the query is allowed to proceed, but the database administrators are notified of the anomalous behavior for follow-up forensics. Some security measures observe which tables are accessed, and others look at the syntactic structure of the query. Regardless, these features are provided to a machine learning algorithm, which builds a classifier to determine if a given query is anomalous or not.

Example Computer System Implementation

Figure 10:
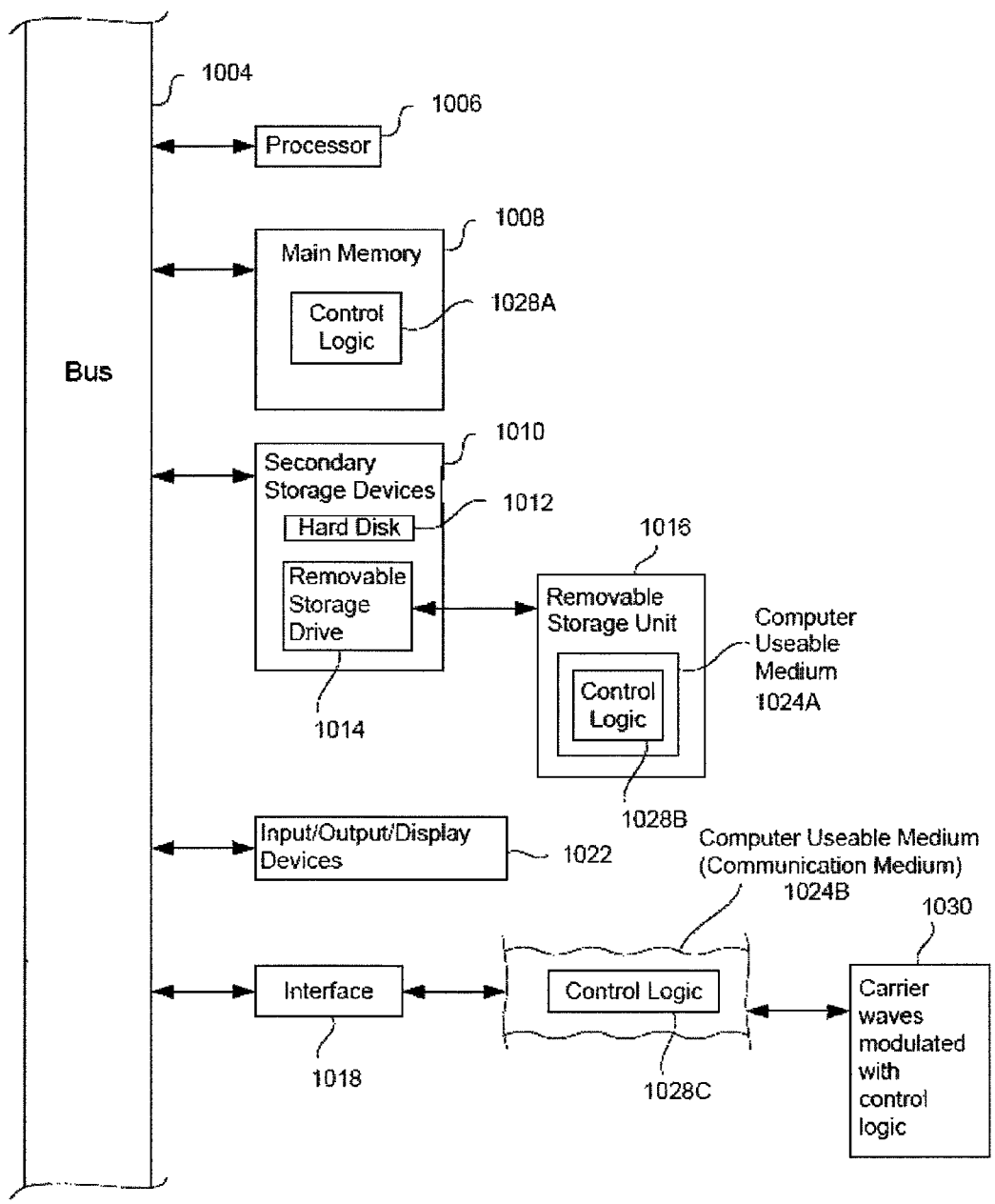
FIG. 10 illustrates an example computer useful for implementing components of embodiments of the invention.

Various aspects of the present invention can be implemented by software, firmware, hardware, or a combination thereof. FIG. 10 illustrates an example computer system 1000 in which the present invention, or portions thereof, can be implemented as computer-readable code. For example, the methods illustrated by flowchart 900 of FIG. 9, can be implemented in system 1000. Various embodiments of the invention are described in terms of this example computer system 1000. After reading this description, it will become apparent to a person skilled in the relevant art how to implement the invention using other computer systems and/or computer architectures.

Computer system 1000 includes one or more processors, such as processor 1006. Processor 1006 can be a special purpose or a general purpose processor. Processor 1006 is connected to a communication infrastructure 1004 (for example, a bus or network).

Computer system 1000 also includes a main memory 1008, preferably random access memory (RAM), and may also include a secondary memory 1010. Secondary memory 1010 may include, for example, a hard disk drive 1012, a removable storage drive 1014, and/or a memory stick. Removable storage drive 1014 may comprise a floppy disk drive, a magnetic tape drive, an optical disk drive, a flash memory, or the like. The removable storage drive 1014 reads from and/or writes to a removable storage unit 1016 in a well known manner. Removable storage unit 1016 may comprise a floppy disk, magnetic tape, optical disk, etc. which is read by and written to by removable storage drive 1014. As will be appreciated by persons skilled in the relevant art(s), removable storage unit 1016 includes a computer usable storage medium 1024A having stored therein computer software and/or data.

In alternative implementations, secondary memory 1010 may include other similar means for allowing computer programs or other instructions to be loaded into computer system 1000. Examples of such means may include a program cartridge and cartridge interface (such as that found in video game devices), a removable memory chip (such as an EPROM, or PROM) and associated socket, and other removable storage units and interfaces which allow software and data to be transferred from the removable storage unit to computer system 1000.

Computer system 1000 may also include a communications interface 1018. Communications interface 1018 allows software and data to be transferred between computer system 1000 and external devices using signals 1030. Communications interface 1018 may include a modem, a network interface (such as an Ethernet card), a communications port, a PCMCIA slot and card, or the like. Software and data transferred via communications interface 1018 are in the form of signals which may be electronic, electromagnetic, optical, or other signals capable of being received by communications interface 1018. These signals are provided to communications interface 1018 via a communications path. A communications path carries signals and may be implemented using wire or cable, fiber optics, a phone line, a cellular phone link, an RF link or other communications channels.

In this document, the terms "computer program medium" and "computer usable medium" and "computer readable medium" are used to generally refer to media such as computer useable medium 1024 in removable storage unit 1016, and a hard disk installed in hard disk drive 1012. Signals carried over communications path can also embody the logic described herein. For example, computer useable medium 1024B may carry control logic 1028C. Computer program medium and computer usable medium can also refer to memories, such as main memory 1008 and secondary memory 1010, which can be memory semiconductors (e.g. DRAMs, etc.). These computer program products are means for providing software to computer system 1000.

Computer programs (also called computer control logic) are stored in main memory 1008 as control logic 1028A, secondary memory 1010 and/or in removable storage unit 1016 as control logic 1028B. Computer programs may also be received via communications interface 1018. Such computer programs, when executed, enable computer system 1000 to implement the present invention as discussed herein. In particular, the computer programs, when executed, enable processor 1006 to implement the processes of the present invention, such as the steps in the methods illustrated by flowchart 900 of FIG. 9, discussed above. Accordingly, such computer programs represent controllers of the computer system 1000. Where the invention is implemented using software, the software may be stored in a computer program product and loaded into computer system 1000 using removable storage drive 1014, interface 1018, hard drive 1012, or input/output/display devices 1022.

The invention is also directed to computer program products comprising software stored on any computer useable medium. Such software, when executed in one or more data processing devices, causes data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

CONCLUSION

Embodiments described above, including anomaly detection system 100 and exemplary method 900, allow administrators to more easily protect their database systems from unexpected attacks, exfiltration attacks, novel attacks and attacks launched by privileged insiders. Administrators may be able to avoid generating a number of custom detection rules by hand. Administrators may also be able to detect some attacks before the query instance is processed by the query engine.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for detecting anomalies for a database system, comprising:
   extracting one or more workload features from a query optimizer based on a query workload of legitimate database queries, the workload features including numerical, categorical, Boolean and set-valued features appearing in the legitimate database queries;
   generating a submodel for each of the one or more extracted workload features;
   extracting values of the workload features from the query optimizer based on a database query instance; and
   comparing a value of each workload feature of the database query instance to prediction values of the submodel to produce a decision being one of legitimate and suspicious for each workload feature and reporting an anomaly based on an overall decision that is based on decisions for all of the workload features before the database query instance is applied to the database system.

2. The method of claim 1, wherein the reporting includes determining a rejection count number based on a number of values that do not meet a threshold value for a corresponding prediction.

3. The method of claim 1, wherein the reporting further comprises classifying the database query instance as legitimate based on a number of correct predictions.

4. The method of claim 1, wherein generating the submodel includes generating a decision tree for at least one of the one or more extracted workload features.

5. The method of claim 1, wherein generating the submodel includes generating a regression tree for at least one of the one or more extracted workload features.

6. The method of claim 1, wherein the one or more extracted workload features includes two or more of numerical, categorical, Boolean and set-valued features.

7. The method of claim 1, wherein the query workload includes query logs of known legitimate database queries.

8. The method of claim 1, wherein the query workload includes query logs for performance testing.

9. The method of claim 1, wherein the one or more extracted workload features include at least one of an expected result size and query attribute.

10. The method of claim 1, wherein the one or more extracted workload features include at least one feature based on query complexity.

11. The method of claim 1, the reporting further comprising reporting an attack on the database system before the query instance is applied to the database system.

12. A system for detecting anomalies for a database system, comprising:
   at least one processor configured to process:
      a query optimizer configured to execute queries;
      a feature modeler configured to:
         extract one or more workload features from the query optimizer based on a query workload of legitimate database queries, the workload features including numerical, categorical, Boolean and set-valued features appearing in the legitimate database queries;
         generate a submodel for each of the one or more extracted workload features; and
         extract values of the workload features from the query optimizer based on a database query instance; and
      an anomaly detector configured to:
         compare a value of each workload feature of the database query instance to prediction values of the submodel to produce a decision being one of legitimate and suspicious for each workload feature and report an anomaly based on an overall decision that is based on decisions for all of the workload features before the database query instance is applied to the database system.

13. The system of claim 12, wherein the anomaly detector is further configured to determine a rejection count number based on a number of values that do not meet a threshold value for a corresponding prediction.

14. The system of claim 12, wherein the anomaly detector is further configured to classify the database query instance as legitimate based on a number of correct predictions.

15. The system of claim 12, wherein the feature modeler is further configured to generate a decision tree for at least one of the one or more extracted workload features.

16. The system of claim 12, wherein the feature modeler is further configured to generate a regression tree for at least one of the one or more extracted workload features.

17. The system of claim 12, the anomaly detector further configured to report an attack on the database system before the query instance is applied to the database system.

18. A non-transitory computer readable medium having control logic stored therein, the control logic enabling a processor to perform operations to detect anomalies for a database system, the operations comprising:
   extracting one or more workload features from a query optimizer based on a query workload of legitimate database queries, the workload features including numerical, categorical, Boolean and set-valued features appearing in the legitimate database queries;
   generating a submodel for each of the one or more extracted workload features;
   extracting values of the workload features from the query optimizer based on a database query instance; and
   comparing a value of each workload feature of the database query instance to prediction values of the submodel to produce a decision being one of legitimate and suspicious for each workload feature and reporting an anomaly based on an overall decision that is based on decisions for all of the workload features before the query instance is applied to the database system.

19. The non-transitory computer readable medium of claim 18, the operations further comprising:
   determining a rejection count number based on a number of values that do not meet a threshold value for a corresponding prediction.

20. The non-transitory computer readable medium of claim 18, the operations further comprising:
   reporting an attack on the database system before the query instance is applied to the database system.

* * * * *

UNITED STATES PATENT AND TRADEMARK OFFICE
CERTIFICATE OF CORRECTION

PATENT NO. : 8,504,876 B2  
APPLICATION NO. : 12/771263  
DATED : August 6, 2013  
INVENTOR(S) : Mork et al.

Page 1 of 1

It is certified that error appears in the above-identified patent and that said Letters Patent is hereby corrected as shown below:

In the Specifications  
Column 6, line 30, --For example, it may difficult to decide-- should be replaced with "For example, it may be difficult to decide".

Signed and Sealed this  
Tenth Day of December, 2013

Margaret A. Focarino  
*Commissioner for Patents of the United States Patent and Trademark Office*